(Model.)
D. HULL.
LOCK NUT AND BOLT.
No. 271,852.  Patented Feb. 6, 1883.
Fig. 1.  Fig. 2.
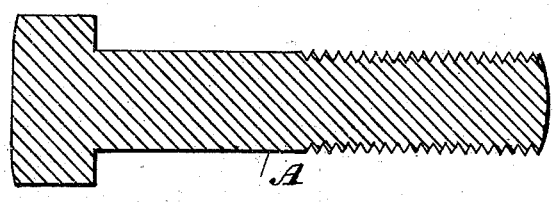 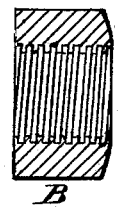
Fig. 3.  Fig. 4.
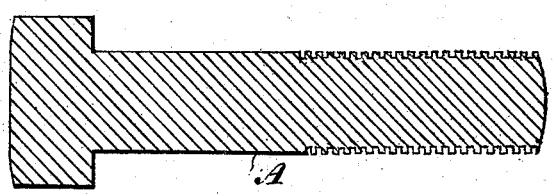 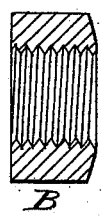
Fig. 7.   Fig. 5.   Fig. 8.
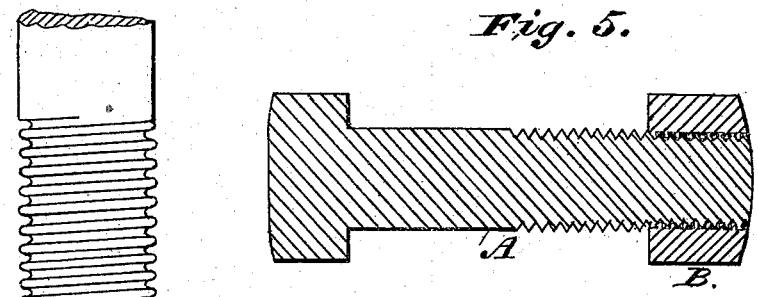
Fig. 6.
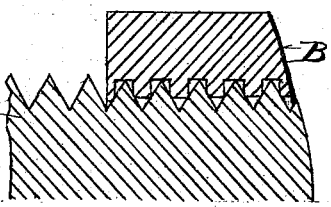
WITNESSES
Lo. F. Keleher.
J. M. Heaton.
INVENTOR
Duane Hull,
By T. C. Brecht,
Attorney

UNITED STATES PATENT OFFICE.

DUANE HULL, OF MILLERTON, NEW YORK.

LOCK NUT AND BOLT.

SPECIFICATION forming part of Letters Patent No. 271,852, dated February 6, 1883.

Application filed June 9, 1882. (Model.)

*To all whom it may concern:*

Be it known that I, DUANE HULL, a citizen of the United States, residing at Millerton, in the county of Dutchess and State of New York, have invented certain new and useful Improvements in Lock Nuts and Bolts; and I do hereby declare the following to be a full, clear, and exact description of the invention, such as will enable others skilled in the art to which it appertains to make and use the same.

My invention relates to improvements in that class of lock-nuts in which the locking of the nut upon the bolt is effected by the different shape of the threads, either of the bolt or of the nut, which is caused by the act of applying the nut.

It is known that patents have heretofore been granted in which the threads of the bolt were upset by the jamming of the nut against the object through which the bolt was inserted, and also in which the threads were cut of variable pitch for the purpose of bringing about an interference of the threads when the nut was set up home into its final position; and also another, in which the thread is of the same shape of the bolt-thread, and the thread is of uniform pitch only part way, or a portion of the thread, while the remainder of the nut-thread is thicker at the edge than the bolt-thread and has a groove enlarged by deepening at the bottom, so that the nut compresses the bolt between the thicker edges of the nut-threads.

My invention consists in forming the threads of the bolt and nut of uniform pitch from center to center of the threads, and making either the nut with a square thread and the bolt with a V-thread, or, vice versa, the bolt with a V-thread and the nut with a square thread. When the two different-shaped threads are brought together the square threads are forced into the spaces of the V-threads, thus impinging on three points—viz., on the two sides of the V-thread and its point, while the square thread impinges with its two points or edges and its base against the V-thread. By this means the following result is obtained: the excessive friction of the threads tends to hold the nut firmly in its place and prevents the nut becoming loosened by concussion or vibration, and any tendency of the nut to unscrew itself is effectually resisted by the impinging portion of the bolt-thread when the nut is applied to it, all of which will be more fully described hereinafter, reference being had to the accompanying drawings, and the letters of reference marked thereon.

In the drawings, Figure 1 is a section of a bolt with a V-thread. Fig. 2 is a section of a nut with a square thread. Fig. 3 is a section of a bolt with square thread. Fig. 4 is a section of a nut with V-thread. Fig. 5 is a section of a bolt with V-thread and a nut with square thread screwed together. Fig. 6 is an enlarged view of a part of Fig. 5. Fig. 7 is a side view of part of a bolt with a modified form of the thread, and Fig. 8 is a section of a nut with similar thread.

In Fig. 1 of the drawings, A represents a bolt of three-quarter-inch diameter, having a V-thread cut upon it, and such a bolt has ordinarily ten threads to the inch, and the nut B (shown in Fig. 2) has a square thread, and must have also ten threads to the inch to fit the bolt. In Figs. 3 and 4 the threads are reversed—*i. e.*, the bolt is provided with a square thread and the nut with a V-thread. In Fig. 5 the bolt has a V-thread and the nut a square thread, and they are screwed together, and the manner of interlocking each other is shown better in the enlarged Fig. 6. In Figs. 7 and 8 the threads are rounded at the top and bottom, instead of being square.

As is well known to those skilled in the art, the depth of a V-thread is ordinarily the same as the width at its base, or equal to the pitch from center to center of thread, while a square thread of the same pitch is half as deep and half as thick as the pitch, so that the square thread will fit snugly between the inclined parts of the V-thread and enter to half its depth, while the point of the V-thread will touch the base of square thread, thus impinging at three points. By thus bringing the two different kinds of threads together the friction at the three points will securely hold the nut onto the bolt until great force is exerted with a wrench to unscrew the nut. A great advantage in this case is that the threads of the bolt or nut are not injured or upset in screwing them together or unscrewing them, while at the same time the nut will remain firmly locked.

Having thus described my invention, what I claim, and desire to secure by Letters Patent, is—

A screw bolt or nut having a V-thread of uniform pitch, in combination with a nut or bolt having a square thread of the same uniform pitch, and one applied to the other, in the manner shown, and for the purpose specified.

In testimony whereof I hereby affix my signature in presence of two witnesses.

DUANE HULL.

Witnesses:
LLOYD F. KELEHER,
F. M. HEATON.